April 21, 1936.   J. B. BRENNAN   2,037,848
ELECTROLYTIC DEVICE AND METHOD OF MAKING SAME
Filed Dec. 21, 1933
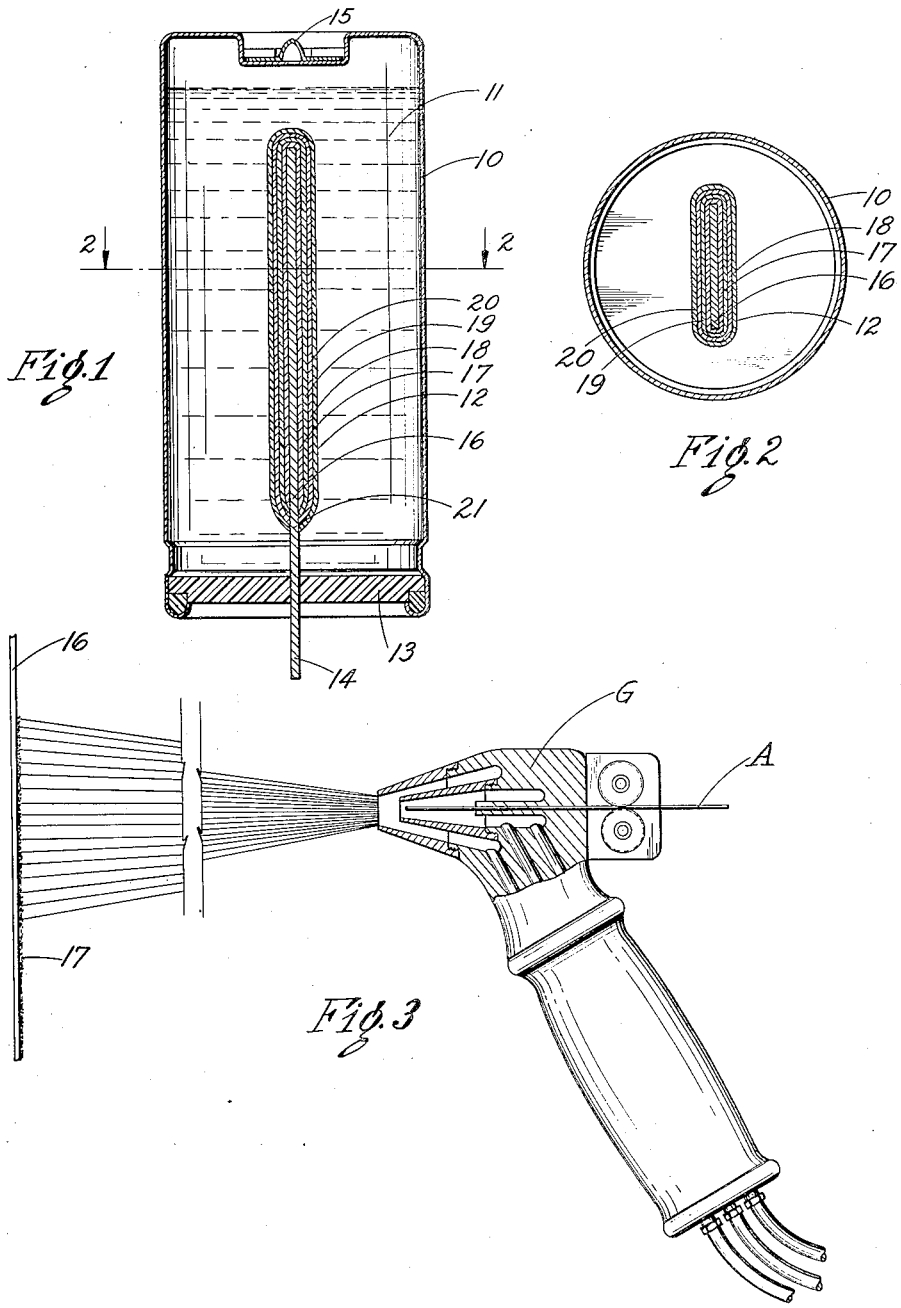
Inventor
JOSEPH B. BRENNAN
By Richey & Watts.
Attorneys Patented Apr. 21, 1936

2,037,848

UNITED STATES PATENT OFFICE 2,037,848

ELECTROLYTIC DEVICE AND METHOD OF MAKING SAME

Joseph B. Brennan, Fort Wayne, Ind.

Application December 21, 1933, Serial No. 703,388

9 Claims. (Cl. 175—315)

This invention relates to electrolytic devices and methods of making the same, and insofar as common subject matter is concerned, this application is a continuation in part of my copending application Serial No. 662,107, filed March 22, 1933.

In my application Serial No. 662,107, I disclosed and claimed broadly an electrode or anode in which a layer of finely divided film forming material was sprayed on a suitable base and thereafter a dielectric film was formed on the sprayed metal.

Electrodes made according to my said application have important advantages, particularly when used as anodes in electrolytic condensers, lightning arresters, rectifiers and similar devices. Such anodes have extremely large capacities per unit of plane area as compared with anodes constructed in accordance with prior practices. By constructing anodes as disclosed in my said application, I am easily able to increase the capacity of a condenser ten times per unit of plane area of the anode as compared with prior art condensers embodying similar electrolytes and similar film forming materials.

An object of the present invention is to provide an improvement in the device and method disclosed in my said application whereby the capacity per unit of plane area of electrode can be still further increased.

I have found that by spraying a layer of film forming material on a suitable base, forming a dielectric film on the sprayed layer, and then successively spraying and forming other layers of film forming material on top of the previously sprayed layer and also on top of the previously formed dielectric film, I can greatly increase the capacity per unit of plane area of the anode over anodes embodying a single sprayed and formed layer as described in my said application. I have found that each layer successively sprayed on the anode, with a dielectric film formed after each spraying operation, produces an increment in capacity substantially as great as the capacity of the first sprayed layer, although the increment is not quite as great after three or more layers have been sprayed, perhaps due to mechanical difficulties in the spraying apparatus or to lack of thorough penetration of the electrolyte to the innermost layers of film forming material. For example, a condenser having a capacity of about 20 mfd. after a single spraying and forming operation has a capacity of about 40 mfd. after the second spraying and forming operation, a capacity of from about 55 to 60 mfd. after the third spraying and forming operation, and a capacity of about 65 to 70 mfd. after the fourth spraying and forming operation.

In the drawing, Figure 1 illustrates more or less diagrammatically a typical form of condenser embodying an anode made according to my invention; Fig. 2 is a sectional view as indicated by the line 2—2 of Fig. 1; and, Fig. 3 illustrates the method and apparatus employed in spraying the film forming material on the anode plate.

As shown in the drawing, the condenser may comprise a metal container 10 which forms the cathode, an electrolyte 11 and an anode 12 immersed within the electrolyte. The bottom of the condenser is sealed by a rubber member 13 through which the terminal 14 extends, and the container is preferably provided with a rubber vent 15 of any desired form to allow the escape of gases generated in operation.

The anode, as illustrated in the drawing, comprises any suitable base 16 which may be formed of sheet aluminum and is preferably integral with the terminal 14, and on which the porous layers of film forming metal are sprayed. The layers of film forming metal, for example aluminum, are indicated diagrammatically at 17 and 18, while the dielectric films are shown at 19 and 20. It is to be understood that the thickness of both layers of film forming material and of the dielectric film are greatly exaggerated in the drawing, the dielectric film ordinarily being very thin, while the film forming metal may preferably be a layer of from about .003 to about .015 of an inch in thickness.

The steps of manufacturing anodes according to my invention are substantially as follows: Any suitable material is first cut to the desired shape, for example in the present embodiment I have indicated an aluminum sheet or plate which is cut to the desired size and shape. Thereafter, a layer of aluminum or other suitable film forming material is sprayed on the surface of the plate, using the apparatus illustrated in Fig. 3. I have obtained satisfactory results by melting aluminum of high purity (preferably 99.7 per cent) with an oxy-acetylene flame at a temperature of more than 1200° F., atomizing the molten metal by means of a blast of compressed air, and projecting the molten metal onto a base held about 10 to 20 inches away from the nozzle of the air jet. A suitable apparatus for carrying out the spraying operation is shown in Fig. 3 of the drawing and more particularly described in my said application Serial No. 662,107. For the purposes of this application, it is sufficient to state that aluminum wire A is melted and atomized in the spray gun G, and the atomized aluminum sprayed against the plate 16 forming the sprayed layer 17.

After the layer has been built up to a thickness of say .010 of an inch, the dielectric film 19 is formed on the surface of the plate, preferably by immersing the plate in an electrolyte comprising an aqueous solution of borax and boric acid and causing a unidirectional electric current to flow therethrough, the positive pole of the source of current being connected to the anode plate. The voltage is regulated and the temperature of the electrolyte controlled in a manner well known to those skilled in the art, and more particularly described in my prior application aforesaid. The resulting dielectric film apparently covers the surfaces of each of the minute particles which make up the plate surface, and conforms to the irregular configuration of the porous, reticulated, sprayed layer. A plate produced as described above and having a single sprayed layer and a single dielectric film may have a capacity at 450 volts of about 1½ mfd. per square inch of plane area when used in an electrolytic condenser.

After the dielectric film has been formed on the surfaces of the first sprayed particles, the plate is removed from the electrolyte and allowed to dry, and a second layer 18 of aluminum or other suitable film forming material is sprayed on top of the first layer and also on top of the dielectric film 19. The spraying operation may be carried out by the method employed to produce the first layer. The second sprayed layer, like the first, seems to be conductive throughout, as each of the sprayed particles in each layer apparently makes electrical contact with adjacent particles in the same layer. In carrying out the second and successive spraying operations, metal is preferably sprayed onto the terminal beyond the end of the first or underlying dielectric film 19 as indicated at 21 in Fig. 1, so that each layer of sprayed metal will make a good electrical contact with the terminal.

After the second spraying operation is completed, another dielectric film 20 is formed on the surface of the sprayed metal in the manner heretofore described. This second forming operation substantially doubles the capacity of the condenser, and a condenser so produced may have a capacity at 450 volts of about 3 mfd. per square inch of plane area of the anode. The successive spraying and forming operations can be carried on indefinitely with increasing capacity so far as I am aware. However, at the present time I believe that from two to four successive spraying and forming operations are preferable.

The theories underlying the operation of devices made according to my invention are not definitely known to me. It seems, however, that the electrolyte penetrates throughout the several layers of film forming material. The layers of dielectric film apparently conform to the irregularities in the underlying sprayed layers, and the succeeding spraying operations apparently do not destroy the previously formed dielectric films. Because of the porosity of the deposited material, there is a very large area of dielectric film in contact with the electrolyte, in comparison with the plane area of the supporting base. In any event, I have demonstrated by tests that a great increase in capacity does take place, each succeeding sprayed and formed layer producing a definite increment in capacity. I have also demonstrated that a similar increase in capacity cannot be obtained merely by spraying on successive layers and forming a dielectric film on the whole mass of sprayed material in a single forming operation. While the thickness of the sprayed layer does affect the capacity somewhat, I have found that best results are obtainable with layers from .003" to .015" in thickness.

Condensers made by my successive spraying and forming method stand up well in use and have low leakage losses as well as low resistance and power factor. The anodes are durable, and the dielectric film reforms quickly after being broken down by excessive voltage.

I have described a preferred form of my invention in connection with electrolytic condensers, but obviously my invention may be applied to other types of condensers and other devices without departing from the spirit or scope thereof. It is therefore to be understood that my invention is not limited to the particular form and embodiment described herein, or in any manner other than by the appended claims when given that range of equivalents to which my patent may be entitled.

I claim:

1. A method of making anodes for electrolytic condensers which includes the steps of spraying film forming material on a suitable base, forming a dielectric film on the sprayed material, spraying another coating of film forming material on the dielectric film and forming another dielectric film on the second coating of sprayed material.

2. A method of making anodes for electrolytic condensers which comprises depositing successive porous coatings of film forming material on a suitable base, and forming dielectric films on each coating so deposited.

3. A method of making electrodes for electrolytic devices including the steps of producing a minutely roughened surface of film forming material, forming a dielectric film on said surface, superposing a minutely roughened layer of film forming material on said dielectric film, and forming another dielectric film on said superposed layer.

4. A method of making electrodes for electrolytic devices including the steps of depositing a conductive layer of finely divided particles of film forming material on a suitable base, forming a dielectric film on the surfaces of the particles so deposited, depositing another conductive layer of finely divided particles of film forming material over the first layer and over the previously formed dielectric film, and thereafter forming another dielectric film on the deposited material.

5. In an electrolytic device, an electrolyte, and a plate in contact therewith comprising superposed layers of finely divided particles of film forming material, there being a dielectric film formed on each layer, and the configuration of the upper layer conforming closely to the configuration of the dielectric film therebeneath.

6. An electrolytic condenser having an anode comprising a base having a plurality of layers of finely divided film forming material sprayed thereon, each layer being conductive throughout its area, and adjacent layers being separated by a dielectric film.

7. An electrolytic condenser having an anode including a plurality of superimposed layers of film forming material and with adjacent layers spaced by an oxide dielectric layer.

8. An electrolytic device comprising in combination, an electrolyte and an electrode in contact therewith comprising superposed porous layers of film forming material, each layer being conductive substantially throughout its entire area, and each layer having a dielectric film thereon.

9. In a condenser the combination of an electrolyte, and an electrode in contact therewith comprising superposed porous layers of film forming material, each layer having a dielectric film thereon, adjacent layers being separated by a dielectric film.

JOSEPH B. BRENNAN.